US010452806B1

United States Patent
Rossman et al.

(10) Patent No.: US 10,452,806 B1
(45) Date of Patent: Oct. 22, 2019

(54) GENERATING A COLORED TRACK PATTERN OF NON-UNIFORM WIDTH FROM A SPARSE SET OF TRACKS

(71) Applicant: Cadence Designs Systems, Inc., San Jose, CA (US)

(72) Inventors: Sabra Rossman, Bellevue, WA (US); Gary Matsunami, Cupertino, CA (US); Karun Sharma, Fremont, CA (US); Steven Riley, San Jose, CA (US); Joshua A. Baudhuin, Portland, OR (US)

(73) Assignee: CADENCE DESIGN SYSTEMS, INC., San Jose, CA (US)

( * ) Notice: Subject to any disclaimer, the term of this patent is extended or adjusted under 35 U.S.C. 154(b) by 122 days.

(21) Appl. No.: 15/425,679

(22) Filed: Feb. 6, 2017

(51) Int. Cl.
*G06F 17/50* (2006.01)

(52) U.S. Cl.
CPC ...... *G06F 17/5081* (2013.01); *G06F 17/5077* (2013.01); *G06F 2217/06* (2013.01)

(58) Field of Classification Search
CPC ............. G06F 17/5045; G06F 17/5068; G06F 17/5077; G06F 17/5081; G06F 2217/06
USPC .................................. 716/110, 126
See application file for complete search history.

(56) References Cited

U.S. PATENT DOCUMENTS

| 8,595,662 B1 | 11/2013 | Yu et al. |
| 8,806,405 B2 | 8/2014 | Colwell et al. |
| 9,026,958 B1 | 5/2015 | Ghosh et al. |
| 9,305,133 B1 | 4/2016 | Ghosh et al. |
| 9,372,955 B1 | 6/2016 | Lee et al. |
| 9,384,317 B1 | 7/2016 | Salowe et al. |
| 9,396,301 B1 | 7/2016 | Lee et al. |
| 9,754,072 B1 | 9/2017 | Salowe et al. |
| 2002/0178429 A1* | 11/2002 | Nakayama .......... G06F 17/5072 716/122 |
| 2003/0009736 A1* | 1/2003 | Suto ..................... G06F 17/5077 716/130 |
| 2008/0120586 A1* | 5/2008 | Hoerold .............. G06F 17/5068 716/52 |
| 2012/0131528 A1* | 5/2012 | Chen ................... G06F 17/5077 716/112 |
| 2012/0223472 A1* | 9/2012 | Kirk ..................... B65H 3/0858 271/9.01 |
| 2012/0241986 A1 | 9/2012 | Sherlekar et al. |
| 2015/0040077 A1* | 2/2015 | Ho ....................... G03F 7/70433 716/51 |
| 2015/0213184 A1* | 7/2015 | Yuan ................... G06F 17/5077 716/129 |
| 2017/0193148 A1* | 7/2017 | Liu ...................... G06F 17/5077 |
| 2018/0173837 A1* | 6/2018 | Won ........................ G03F 1/68 |

* cited by examiner

*Primary Examiner* — Paul Dinh
(74) *Attorney, Agent, or Firm* — Foley & Lardner LLP

(57) ABSTRACT

Embodiments according to the present disclosure relate to physically implementing an integrated circuit design while conforming to the requirements of complex color based track systems. In embodiments, the color based track systems can include irregularly spaced and non-uniform width colored tracks. These and other embodiments include a methodology to automatically generate a track pattern for an integrated circuit design that satisfies both design constraints and user inputs. Various alternatives for identifying starting points in the design for automatically generating track patterns are possible.

18 Claims, 14 Drawing Sheets

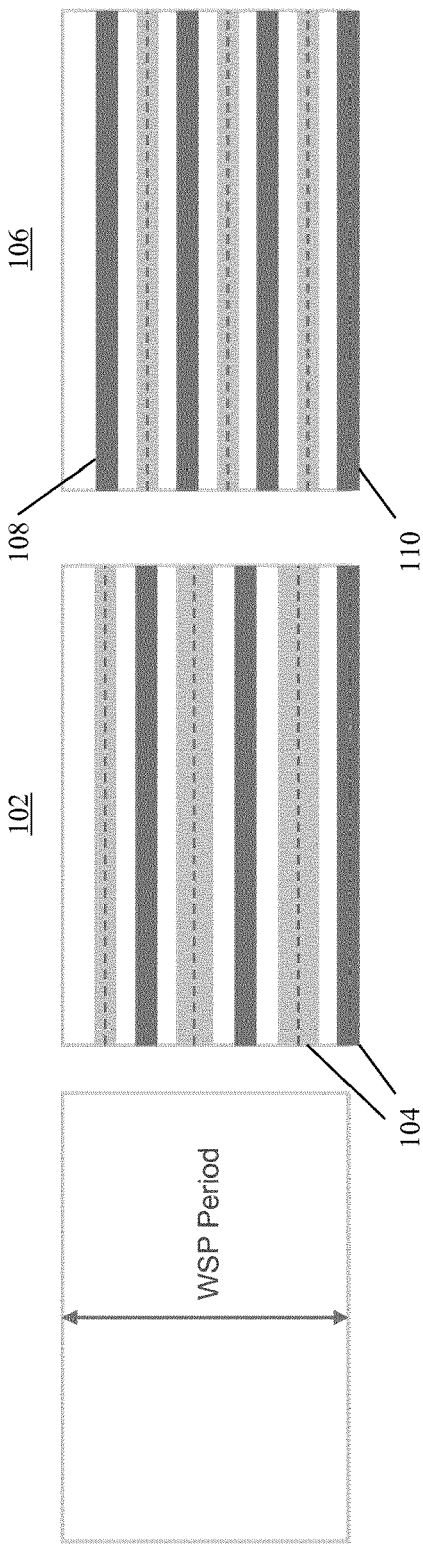

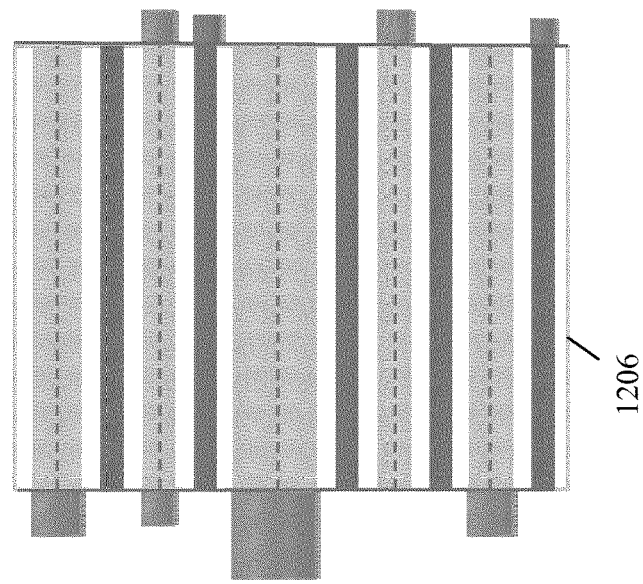
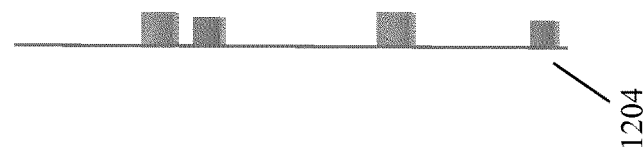
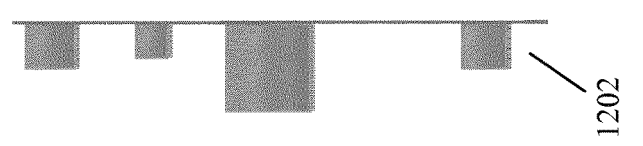
FIG. 12

US 10,452,806 B1

GENERATING A COLORED TRACK PATTERN OF NON-UNIFORM WIDTH FROM A SPARSE SET OF TRACKS

TECHNICAL FIELD

The present disclosure relates to integrated circuits, and more particularly to techniques for implementing designs of integrated circuits in processes that include coloring for multiple patterning and track based systems.

BACKGROUND

Electronic design automation (EDA) tools are used to design integrated circuits. Integrated circuits can include many thousands and perhaps millions of circuit elements (e.g., transistors, logic gates, diodes, etc.) and interconnecting wires and busses. The circuit elements and wires can be formed on many different layers, with various interconnections (e.g., vias) between layers. EDA tools allow a designer to describe an integrated circuit based on its desired behavior, and then transform that behavioral description into a set of geometric shapes called a layout which forms the circuit elements and wires for all the different layers.

As integrated circuit feature sizes continually get smaller and smaller (e.g., 10 nm and below), EDA tools need to be aware of an ever-increasing number of constraints (i.e., design rules or design rule manuals (DRMs)) to ensure that shapes are placed correctly for a target fabrication process. For example, some foundries specify that shapes of a design can only be placed in parallel routing tracks (hereinafter simply "tracks") running in one direction of a given layer or portion of a layer and shapes in these tracks must conform to certain legal width requirements (i.e., having a specific one of a number of pre-specified legal widths). Moreover, to allow a design to be implemented by multiple patterning processes (e.g., double patterning), shapes in adjacent tracks may have alternate colors (e.g., B for shapes to be included in a "blue" photomask, C for shapes to be included in a "cyan" photomask, etc.) and the widths for shapes in adjacent tracks may need to conform to further requirements.

Patterns of tracks can be specified for an integrated circuit design, wherein a set of adjacent tracks have associated widths, spacing and colors (i.e., non-uniform width space patterns (WSPs)), and these patterns can be repeated in a given layer with a corresponding period. Tracks themselves have zero width in physical designs (e.g., a layout of an electronic design) and are merely used to guide physical implementation tools (e.g., floorplanner, placement tools, or routing tools) to implement the physical design for an electronic design. For example, a routing tool may lay the centerline of a wire segment along a routing track during the routing process. The width associated with a particular routing track is used to route wires having shapes with the associated width.

Track patterns are not always provided by the technology and in those cases they must be created as part of the design process. The process of generating non uniform, colored, and design rule correct track patterns can be very complex.

SUMMARY

Embodiments according to the present disclosure relate to physically implementing an integrated circuit design while conforming to the requirements of complex color based track systems. In embodiments, the color based track systems can include irregularly spaced and non-uniform width colored tracks. These and other embodiments include a methodology to automatically generate a track pattern for an integrated circuit design that satisfies both design constraints and user inputs. Various alternatives for identifying starting points in the design for automatically generating track patterns are possible.

BRIEF DESCRIPTION OF THE DRAWINGS

These and other aspects and features of the present embodiments will become apparent to those ordinarily skilled in the art upon review of the following description of specific embodiments in conjunction with the accompanying figures, wherein:

FIGS. 1(A) to 1(C) are diagrams illustrating example aspects of some challenges to generating track patterns in an integrated circuit design;

FIG. 12 is a diagram illustrating aspects of identifying pins for use in generating a track pattern in an integrated circuit design according to embodiments;

DETAILED DESCRIPTION

Figures 2A, 2B, 2C:
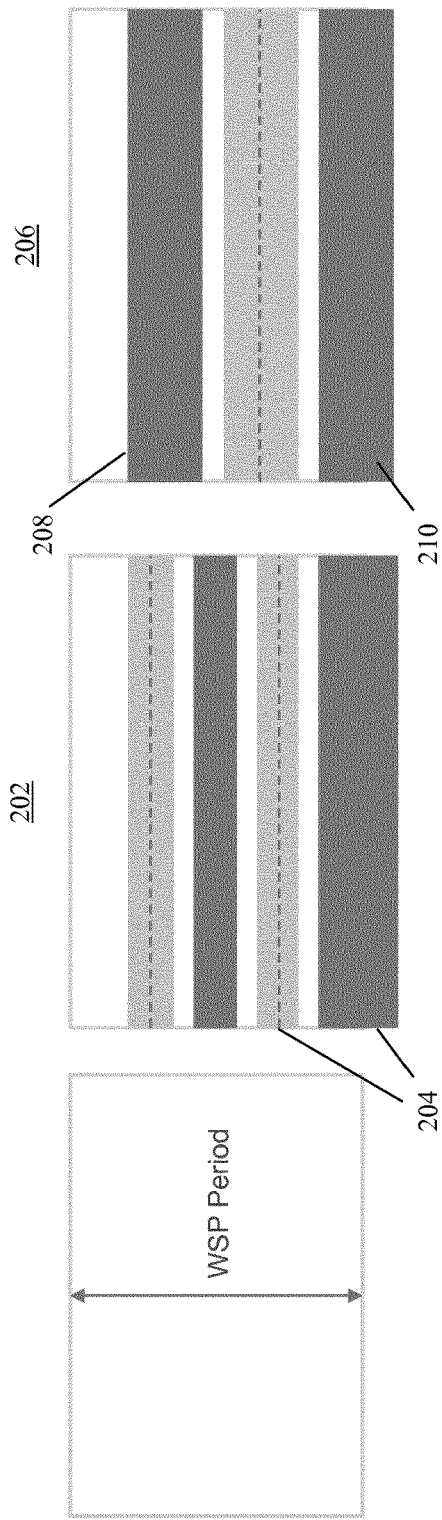
FIGS. 2(A) to 2(C) are diagrams illustrating example aspects of other challenges to generating track patterns in an integrated circuit design.

The present embodiments will now be described in detail with reference to the drawings, which are provided as illustrative examples of the embodiments so as to enable those skilled in the art to practice the embodiments and alternatives apparent to those skilled in the art. Notably, the figures and examples below are not meant to limit the scope of the present embodiments to a single embodiment, but other embodiments are possible by way of interchange of some or all of the described or illustrated elements. Moreover, where certain elements of the present embodiments can be partially or fully implemented using known components, only those portions of such known components that are necessary for an understanding of the present embodiments will be described, and detailed descriptions of other portions of such known components will be omitted so as not to obscure the present embodiments. Embodiments described as being implemented in software should not be limited thereto, but can include embodiments implemented in hardware, or combinations of software and hardware, and vice-versa, as will be apparent to those skilled in the art, unless otherwise specified herein. In the present specification, an embodiment showing a singular component should not be considered limiting; rather, the present disclosure is intended to encompass other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present embodiments encompass present and future known equivalents to the known components referred to herein by way of illustration.

According to certain general aspects, the present embodiments relate to physically implementing integrated circuit designs such that they conform to complex constraints imposed by fabrication processes. According to certain additional aspects, the present embodiments relate to providing EDA tools that are aware of these constraints and are adapted to implement designs that conform with them.

For example, some fabrication processes require all circuit elements to be located in tracks having specified widths and that are separated by specified gaps. These tracks are generally specified to run in a single direction on a given layer or designated portion or region of a layer of the integrated circuit. For example, the tracks on one layer may be specified to run in a vertical or north-south direction, while the tracks on an adjacent layer above or below may be specified to run in a horizontal or east-west direction. In some fabrication processes, the tracks are specified to have uniform widths and uniform spacing. However, at process nodes of 10 nm and below, integrated circuit designs may need to conform to complex track systems called width spacing patterns ("WSPs").

Another constraint of which EDA tools need to be aware are those imposed by multiple patterning processes, of which double patterning (DP) is a common example. These processes separate a layout into two or more patterns, which are then separately imaged onto the same layer of the integrated circuit using separate masks. The process of separating a layout into two or more patterns is called "coloring." In the coloring process, each shape in the design is assigned to one of the multiple patterns or is figuratively "colored" with a color respectively associated with the assigned pattern. In other words, all shapes assigned to the same pattern in a given layer share the same color.

Some integrated circuit processes include both track and coloring constraints. In such cases, not only are shapes assigned to specified patterns or associated colors, tracks are also assigned to specified patterns or associated colors. Typically, for a double patterning process, adjacent tracks are assigned to alternating colors, with similar types of assignment schemes for higher order patterning processes. Design rules for a process that governs which tracks associated with certain widths may be situated immediately adjacent to another track associated with a width are referred to as pair rules or BC rules where B stands for blue and C stands for cyan in a double patterning processes. Design rules governing which three-width combinations are legal are referred to as triplet rules or BCB rules.

In the early stage of a design it is often the case a designer will have a set of target shapes or pins defined, but will not have a track pattern that can be applied to the entire block or design to facilitate the rest of the design process. In this case it is essential to have a tool to generate a design rule correct track pattern to facilitate the design process.

Currently the only method for automatically generating WSPs for layout design is a precompiled approach (.so) using BCB rules. This methodology using BCB rules generates multiple (sometimes thousands of) patterns and user is required to select one from them. Moreover, this methodology requires a large precompiled pattern library for each foundry which needs to be recompiled when the spacing rules change.

Many technologies don't have BCB rules but still need to generate optimized patterns from pin locations, and they need the patterns to be design rule correct. For WSP aware design flows this is an essential step now in starting the design process. Current methods for non-BCB technologies are generically guess and check.

According to certain aspects, therefore, the present embodiments relate to automatically generating track patterns for implementing an integrated circuit design, which patterns satisfy process and design rules and also conform to user defined inputs.

FIGS. 1A to 1C illustrate certain challenges to automatically generating track patterns that have been identified by the present applicants. As shown in FIG. 1A, a designer may wish to generate a track pattern having a certain period (i.e., WSP period) and a maximum number of tracks in the pattern. This example shows how problems can arise due to complex pitch related spacing rules where a smaller width or space between tracks in a pattern can trigger the forbidden pitch, while having a larger width or space between tracks in a pattern will prevent more tracks from being included. In the pattern 102 shown in FIG. 1B, some tracks 104 have a width more than the minimum required in order to avoid spacing or color violations. However, the desired number of tracks in the pattern have not been reached. In FIG. 1C, another track is added to the pattern 106, but a coloring violation has been introduced between the last track 108 of a first period and what will be the first track 110 of a second period.

FIGS. 2A to 2C illustrate certain other challenges to automatically generating track patterns. As shown in FIG. 2A, a designer may wish to generate a track pattern having a certain period (i.e., WSP period) and a maximum metal density in the pattern. This example shows how problems can arise due to complex pitch related spacing rules where a larger width or smaller space between tracks can trigger the forbidden pitch while having a smaller width or more spacing between tracks will reduce density. In the pattern 202 shown in FIG. 2B, some tracks 204 have a width less than the maximum to avoid spacing or color violations, but the desired metal density has not been reached. In FIG. 2C, more metal density has been included in the pattern 206 but a coloring violation has been introduced between the last track 208 of a first period and what will be the first track 210 of a second period.

Figure 3:
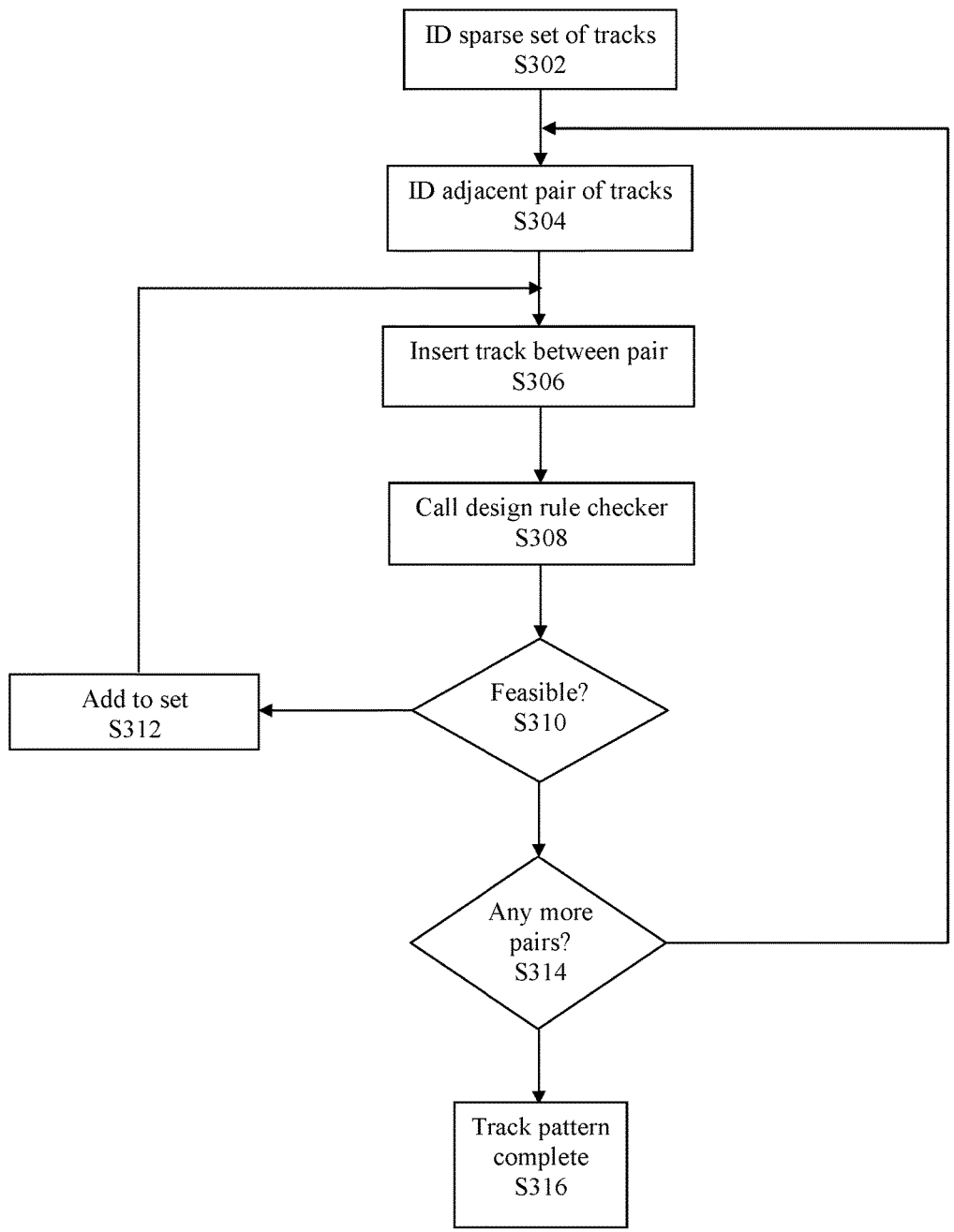
FIG. 3 is a flowchart illustrating an example methodology for generating a design rule correct track pattern in an integrated circuit design according to the present embodiments.

FIG. 3 is a flowchart illustrating an example methodology according to embodiments.

In a first step S302, a "sparse" set of tracks in a design is identified. This can be done manually by a designer or it can be done automatically by an EDA tool as adapted by the present embodiments. For example, a set of two or more tracks can be identified that have a metal density below a given threshold, while the distance between the first and last tracks in the set fall within a desired period. It should be noted that there are many additional or alternative possible examples for identifying a starting point in a design for automatically generating tracks, including allowing a user to identify or select locations, tracks, pins or other elements in a design to use as a starting point, as will become more apparent from the descriptions below.

In step S304, an adjacent two tracks t1 and t2 in the set are provided or identified. These tracks will already have assigned colors and widths. For example, the widths of t1 and t2 can each be constrained to being one allowable track width among a discrete set of allowable track widths for the process. Alternatively, the widths can be widths in an allowable range at certain allowable step width values. The colors are one of the specified colors for the multiple patterning process. The assigned color of t1 will be maintained, but the color of t2 may be re-assigned by the algorithm if necessary as described below. It should be noted that the term "adjacent" is not intended to be limiting as far as the space between t1 and t2, but can merely mean that there are no other tracks between t1 and t2.

In step S306, for each pair of tracks in the set, an attempt is made to fill the gap between the tracks with additional tracks. Filling is done by presenting or adding a new track t3 between the two tracks t1 and t2. In one example, the spacing between t1 and t3 is set to be a minimal positive value and the width of t3 is set to be the same as t1. As for colors, the color of t1 is maintained. Then the colors of the other tracks are assigned by cycling through the colors in the applicable color model for the process starting with the color of t1. For example, if the process has a three color model, and t1 has color1, then t3 is assigned color2 and t2 is assigned color3.

In step S308, a design rule check is performed (e.g., by calling a design rule checker) to determine the required spacing between t1 and t3 given t2. However, as set forth previously, because tracks themselves do not have widths, in order to perform a rule check in some example embodiments, the new set of tracks t1, t2 and t3 is first translated into geometric colored shapes. For example, in some embodiments, based on the above information for the tracks, the generated geometric representations are zonetree representations such as those described in U.S. Pat. No. 7,100,128, the contents of which are incorporated herein by reference in their entirety. Those skilled in the art will understand how to form zonetree representations of the tracks using the information described above based on the incorporated patent, and so further details thereof will be omitted here for sake of clarity of the invention.

A set of design rules, requirements, or constraints (hereinafter design rules or rules collectively) that govern tracks, track patterns, or interconnections between pins or implementation of electronic designs may be identified in step S308 (either independently or by a separate design rule checker). Illustrative design rules may include, for example, a minimum spacing design rule governing the minimum spacing between two adjacent wires, design rules governing which tracks associated with certain widths may be situated immediately adjacent to another track associated with a width (e.g., pair rules or BC rules where B stands for blue and C stands for cyan in double patterning governing which two-width combinations are legal or triplet rule or BCB rule governing which three-width combinations are legal, etc.), one or more other design rules such as a minimum length rule governing the minimum length required for an interconnect segment, a same track line-end design rule, a different track line-end design rule, a keep-out design rule, or one or more design rules governing repetitive track patterns, etc.

As determined in step S310, if the required spacing between t1 and t3 is feasible, and doesn't result in a violation with t2, the process proceeds to step S312 where the new track t3 is added to the set at a spacing from t1 as specified by the rule checker. Processing returns to S304, with the new pair of tracks being t3 and t2, and an attempt is made to add a new track between t3 and t2 (with the assigned color of t1 being maintained as described above). The processing described above in connection with steps S306, S308 and S310 is performed iteratively until no more tracks can be added between t1 and t2 without any design rule and/or coloring violation.

If it is determined in step S310 that the required spacing between t1 and t3 is not feasible, or if the addition of t3 results in a violation with t2, then the new track t3 is not added to the set and processing proceeds to step S314, where it is determined if there are any more pairs in the set that have not been checked. For example, there may be another track adjacent to t2 opposite from t1, and no attempts have yet been made to insert tracks between this pair of tracks. If so, processing returns to step S304 and the processing of S306, S308 and S310 is performed for all pairs of tracks in the original set, with the result in S316 being a complete track pattern set.

It should be noted that, once a track pattern is generated as described above, it can be replicated in the design at a period defined by the first and last tracks in the set, and/or a period specified by a user. This replication can be performed until a region in the design is filled with tracks, for example.

Figure 4:
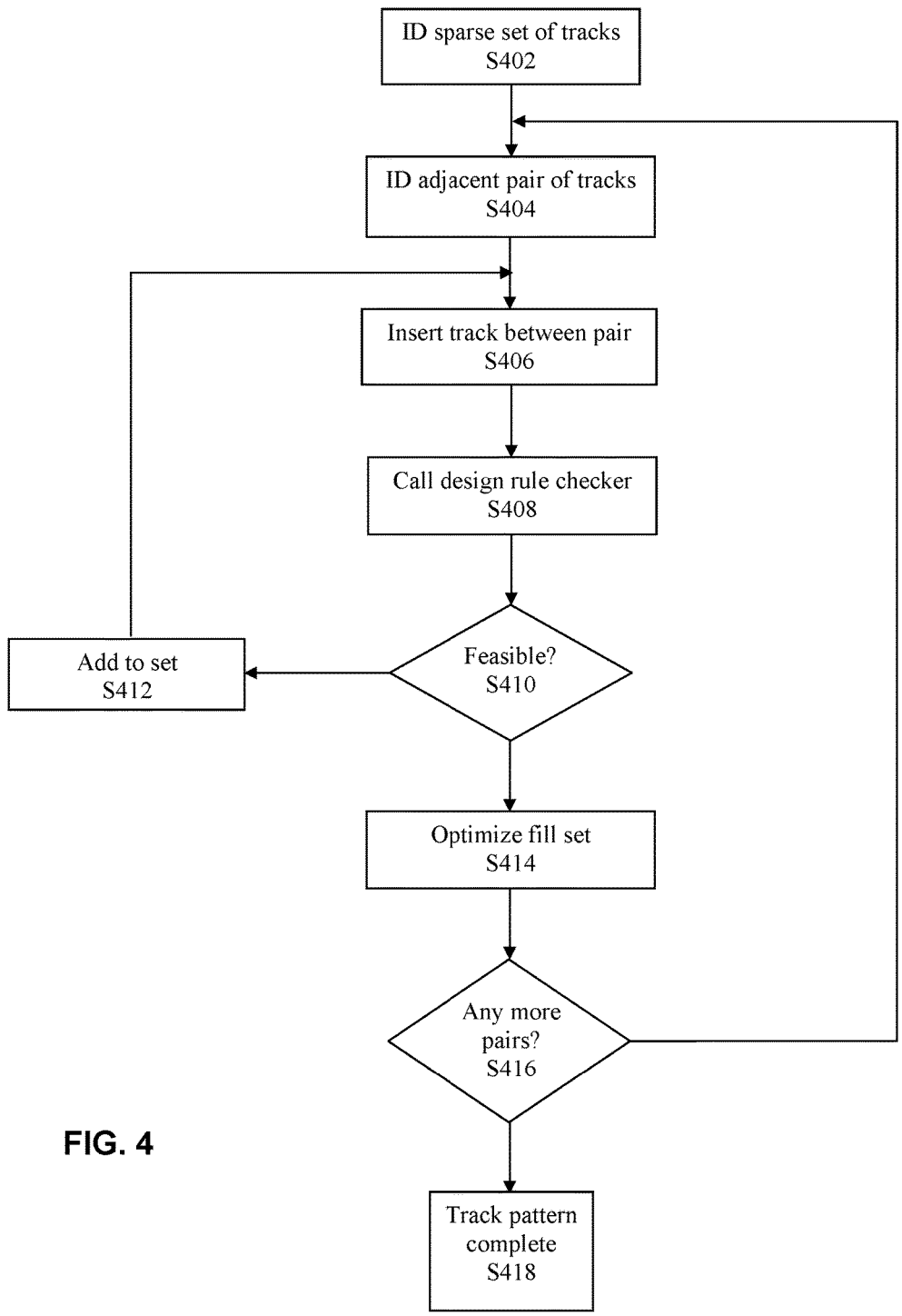
FIG. 4 is a flowchart illustrating another example methodology for generating a design rule correct track pattern in an integrated circuit design according to the present embodiments.

Another example methodology according to embodiments is shown in FIG. 4. According to certain aspects, the example method shown in FIG. 4 further optimizes the example method of FIG. 3 so as to fill the entire region between t1 and t2.

In FIG. 4, the processing of steps S402, S404, S406, S408, S410, S412, S416 and S418 can be performed similarly as described above in connection with steps S302, S304, S306, S308, S310, S312, S314 and S316, respectively, of the example method of FIG. 3.

As can be seen in FIG. 4, the methodology in this example includes additional step S414 after all the feasible tracks have been added between a pair of tracks, such as t1 and t2 as described above. In the optimizing step S414, t2 is first removed from the fill set of tracks, which are then translated into geometric shapes as in step S408. Next in step S414, after calling the design rule checker or otherwise checking whether design rules are satisfied, the fill tracks are compacted (e.g., spaced via design rule feedback), and any tracks that have been newly spaced at or past t2 are removed. After this is done, t2 is included in a final design rule check performed in step S414 to remove any additional fill tracks that violate t2.

Figure 5:
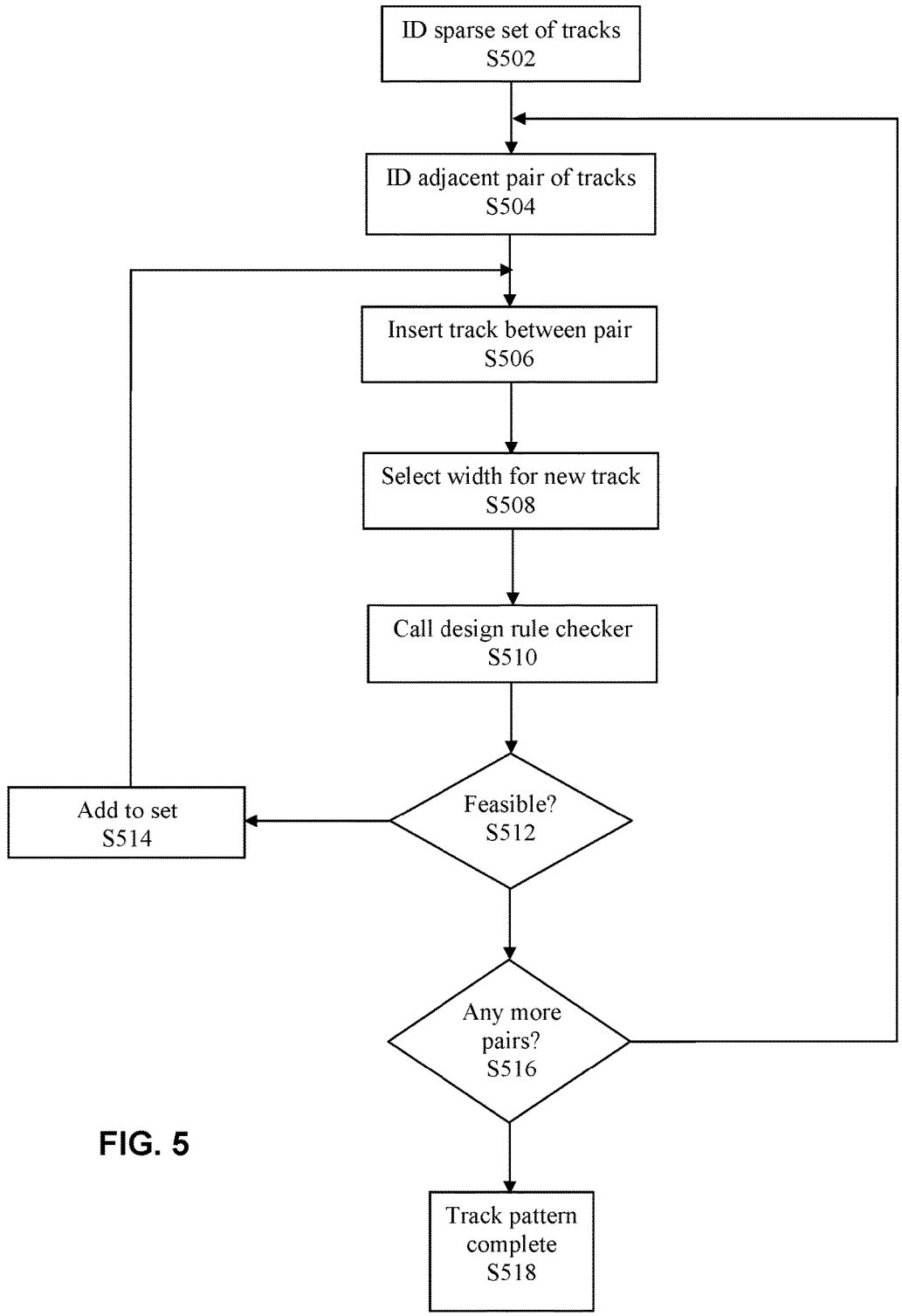
FIG. 5 is a flowchart illustrating another example methodology for generating a design rule correct track pattern in an integrated circuit design according to the present embodiments.

Another example methodology according to embodiments is shown in FIG. 5. According to certain aspects, the example method shown in FIG. 5 adapts the example method of FIG. 3 to support adding tracks of different widths. In FIG. 5, the processing of steps S502, S504, S506, S510, S512, S514, S516 and S518 can be performed similarly as described above in connection with steps S302, S304, S306, S308, S310, S312, S314 and S316, respectively, of the example method of FIG. 3.

As can be seen in FIG. 5, the methodology in this example includes additional step S508 after inserting a new track between a pair of tracks in the set. In one example implementation of this step S508, a list of widths is specified that the new tracks can choose from. In some embodiments, the best track width to be selected in step S508 can be determined by a desired density (e.g., summing the widths of the added tracks). In other embodiments, the track width can be selected base on a desired frequency (e.g., counting the total number of tracks added).

Many other adaptations and alternatives of the above example methodologies are possible, including having certain track generation parameters being selected by a user.

Figure 6:
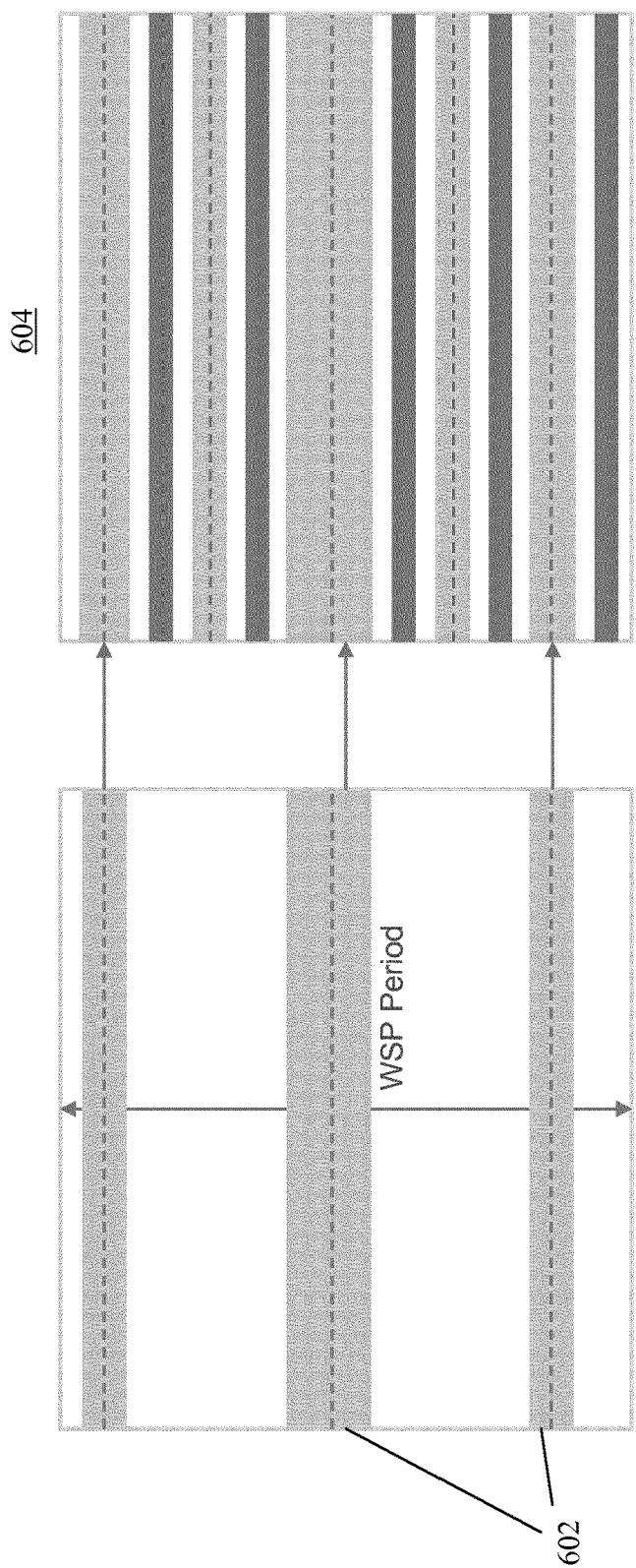
FIG. 6 is a diagram illustrating aspects of identifying seed tracks for generating a track pattern in an integrated circuit design according to embodiments.

For example, as shown in FIG. 6, a user can specify a set of one or more tracks 602 in a region of a design, as well as a starting and end point to use as a WSP period. The user can also specify other optimizing criteria, such as generating a track pattern set 604 with the specified tracks 602 and a maximum number of additional tracks.

Figure 7:
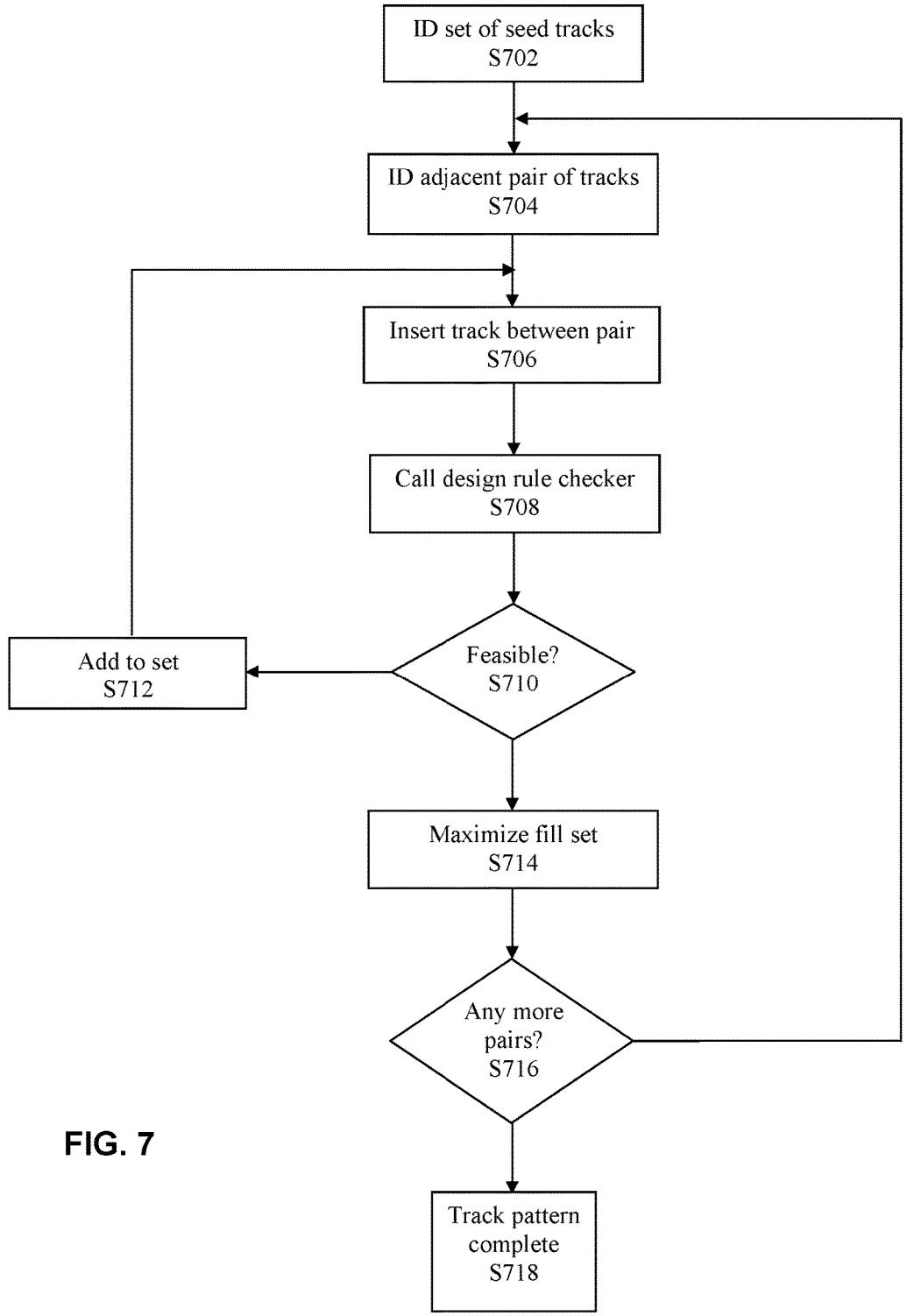
FIG. 7 is a flowchart illustrating an example methodology in accordance with FIG. 6 for generating a design rule correct track pattern in an integrated circuit design according to the present embodiments.

FIG. 7 is a flowchart illustrating an example methodology according to these embodiments. In FIG. 7, the processing of steps S704, S706, S708, S710, S712, S714, S716 and S718 can be performed similarly as described above in connection with steps S404, S406, S408, S410, S412, S414, S416 and S418, respectively, of the example method of FIG. 4.

As can be seen in FIG. 7, the methodology in this example includes initial step S702 in which the set of two or more seed tracks 602 (i.e., their locations, widths, colors and the WSP period) is received. This set of seed tracks 602 is used as the initial sparse set. Moreover, in this example, the optimizing criteria used in step S714 is selected by the user (e.g., creating a maximum number of tracks in this example).

Figure 8:
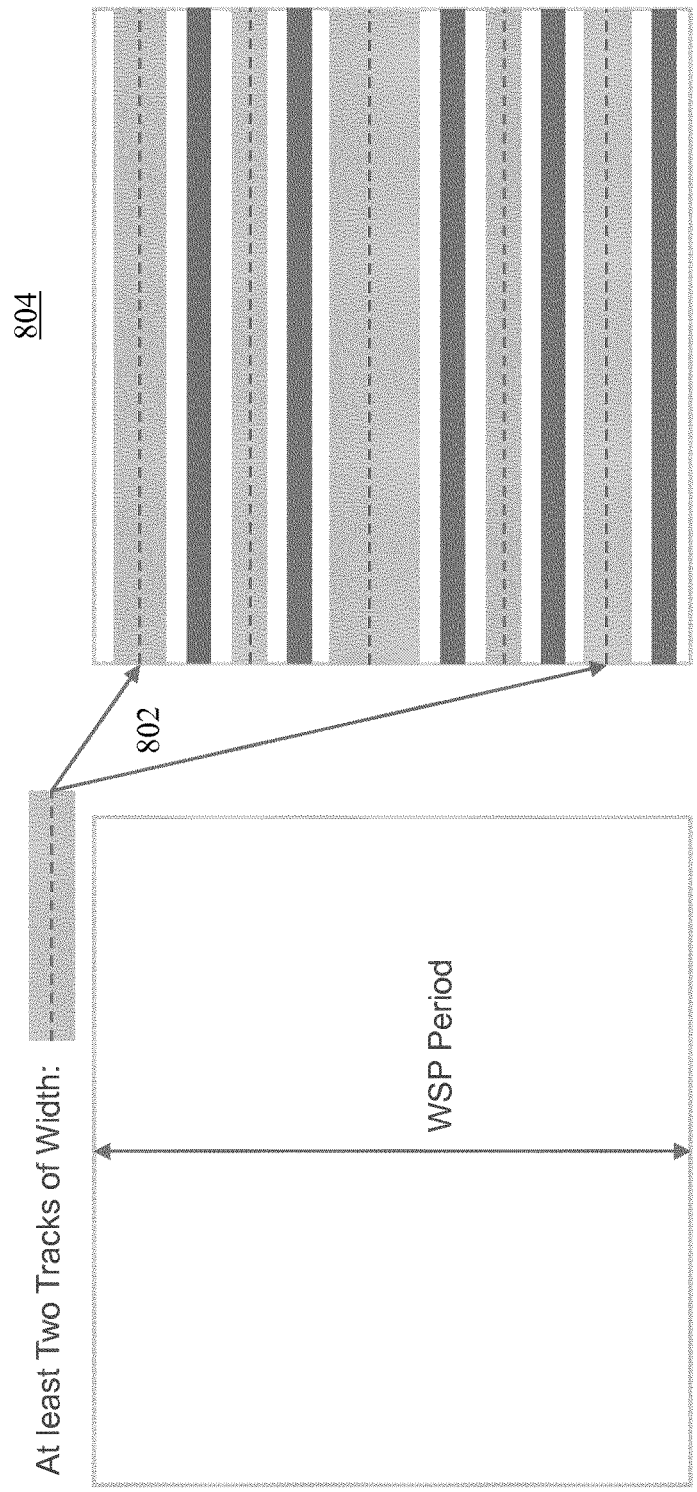
FIG. 8 is a diagram illustrating aspects of another example of identifying seed tracks for generating a track pattern in an integrated circuit design according to embodiments.

As another example, as shown in FIG. 8, a user can specify only the width of at least two tracks 802 in a region of a design, but not their locations, as well as a starting and end point to use as a WSP period. As in the above example, the user can also specify other optimizing criteria, such as generating a track pattern set 804 with the tracks 802 having the specified width and a maximum number of additional tracks.

Figure 9:
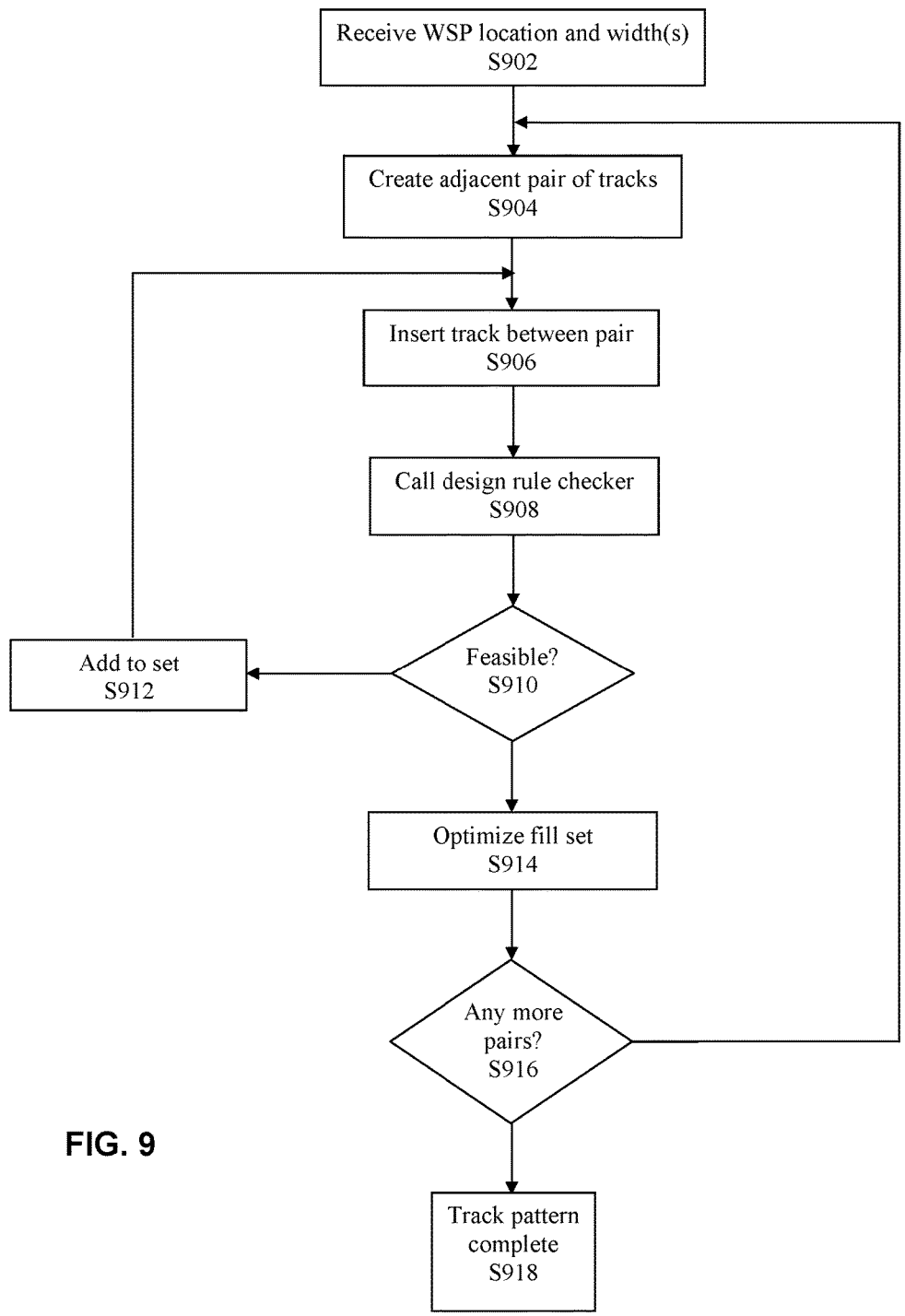
FIG. 9 is a flowchart illustrating an example methodology in accordance with FIG. 8 for generating a design rule correct track pattern in an integrated circuit design according to the present embodiments.

FIG. 9 is a flowchart illustrating an example methodology according to these embodiments. In FIG. 9, the processing of steps S906, S908, S910, S912, S914, S916 and S918 can be performed similarly as described above in connection with steps S406, S408, S410, S412, S414, S416 and S418, respectively, of the example method of FIG. 4.

As can be seen in FIG. 9, the methodology in this example includes initial step S902 in which the widths of two or more tracks 802 (along with the colors and the WSP period and location) is received (e.g., allowable widths in a discrete set of allowable widths for a process as set forth above). In step S904 this information is used to create an initial pair of tracks, for example, two tracks having the specified width at either end of the specified WSP period. Moreover, in this example, the optimizing criteria used in step S914 is selected by the user (e.g., creating a maximum number of tracks in this example).

Figure 10:
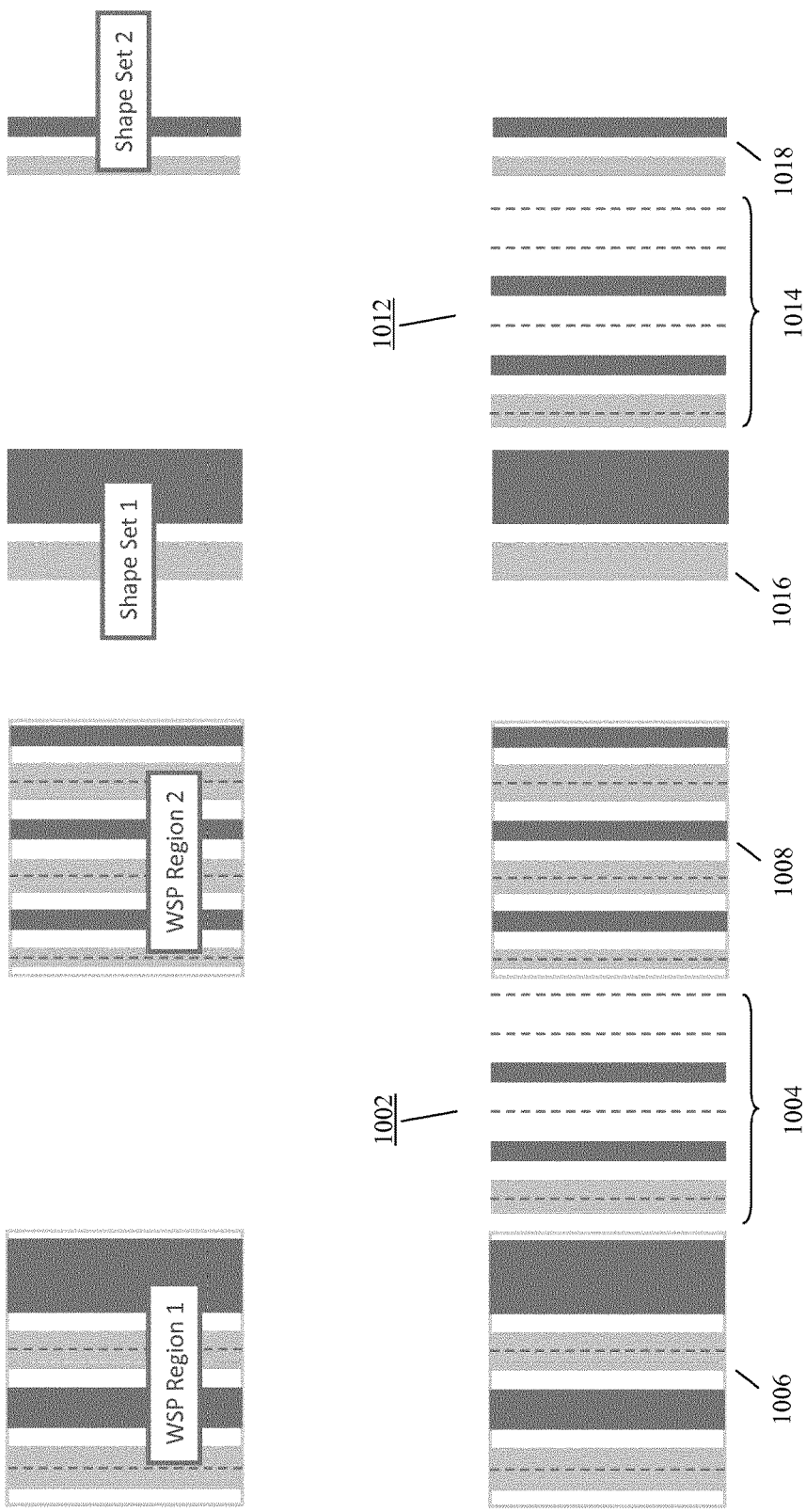
FIGS. 10A and 10B are diagrams illustrating aspects of identifying regions for generating a track pattern in an integrated circuit design according to embodiments.

As another example shown in FIG. 10A, the example methodology can be adapted to fill a transition region 1002 where no tracks exist with a set of new tracks 1004. In this example, the transition region is between two regions 1006 and 1008 having existing WSPs. In another example shown in FIG. 10B, the example methodology can be adapted to fill a transition region 1012 where no tracks or shapes exist with a set of new tracks or shapes 1014. In this example, the transition region is between two regions 1016 and 1018 having existing sets of shapes.

Figure 11:
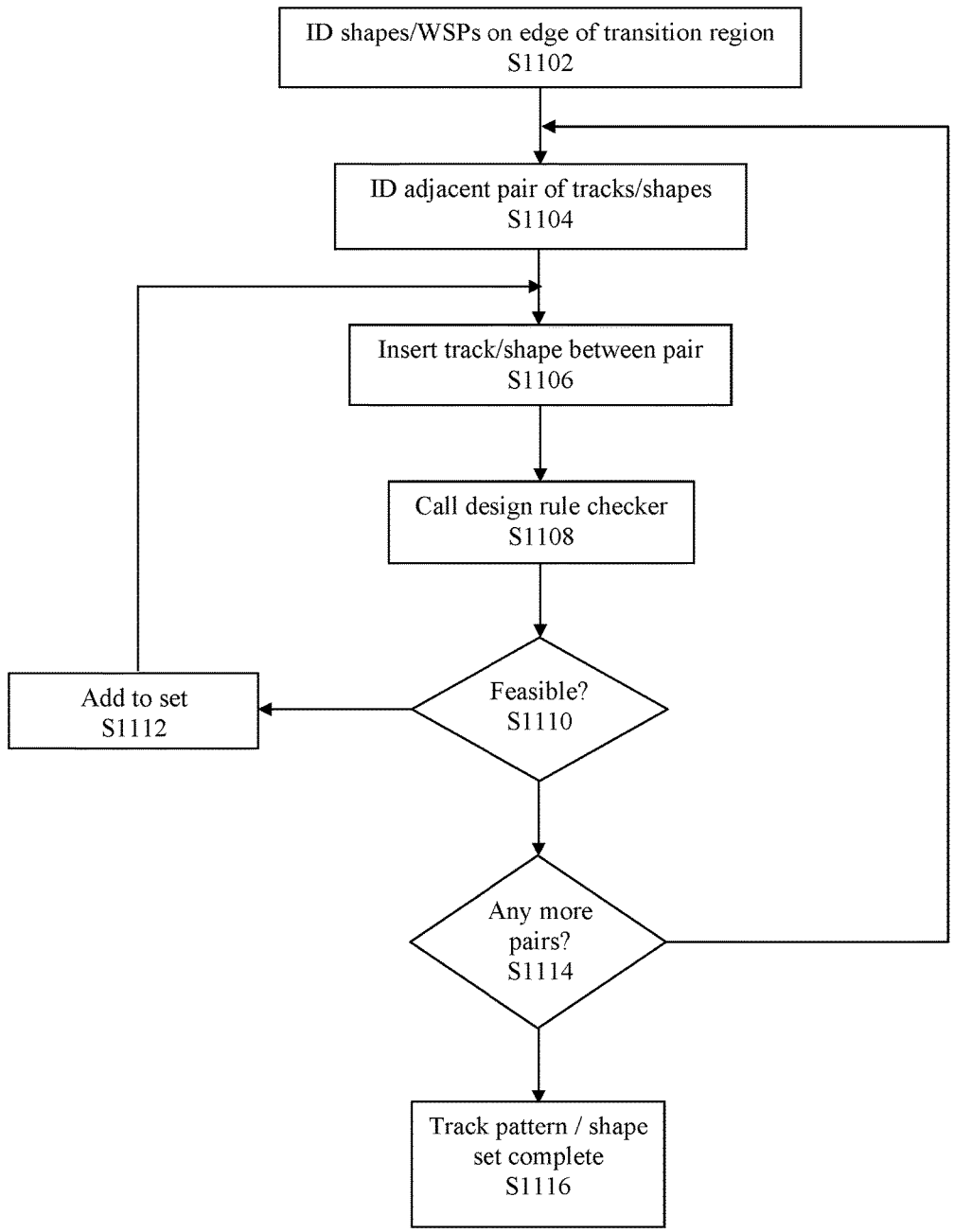
FIG. 11 is a flowchart illustrating an example methodology in accordance with FIG. 10 for generating a design rule correct track pattern in an integrated circuit design according to the present embodiments.

FIG. 11 is a flowchart illustrating an example methodology according to these embodiments. In FIG. 11, the processing of steps S1106, S1108, S1110, S1112, S1114 and S1116 can be performed similarly as described above in connection with steps S306, S308, S310, S312, S314 and S316, respectively, of the example method of FIG. 3. However, as shown in FIG. 11, these steps have been further adapted to perhaps generate a shape set rather than a track pattern set.

As can be seen in FIG. 11, the methodology in this example includes initial step S1102 in which the bordering WSP regions 1006, 1008 or bordering shape sets 1016, 1018 are received. In a next step S1104, the tracks or shapes on the edges of these regions or sets are used as the initial pair of tracks/shapes for generating a track/shape fill set 1004, 1014 in the transition regions 1002, 1012.

As yet another example shown in FIG. 12, the example methodology can be adapted to create tracks where only the locations of some pins are known. In this example, a design includes sets 1202 and 1204 of facing pins, and the methodology is used to create a legal set of tracks 1206 that connect to, and perhaps also between, these pins.

Figure 13:
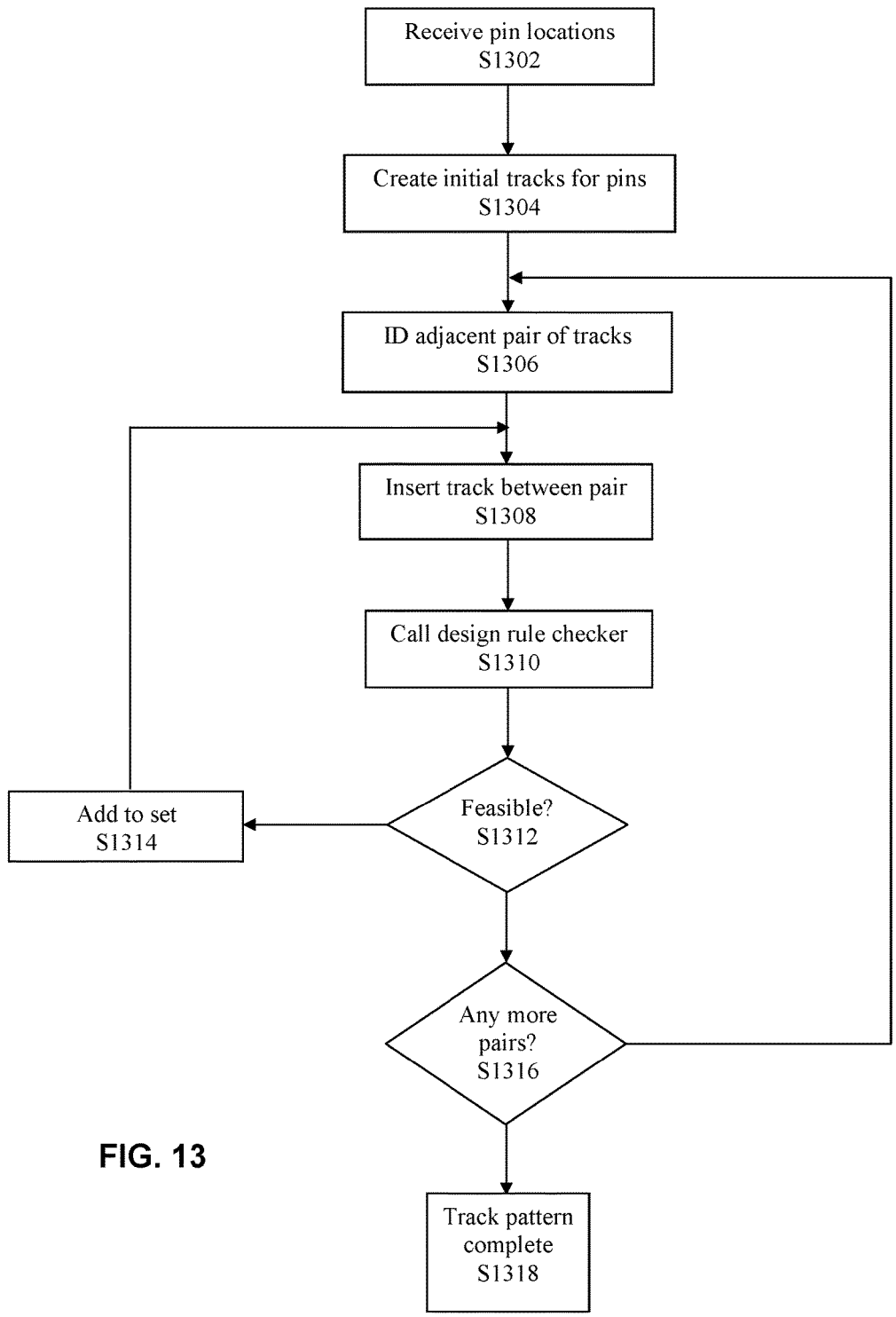
FIG. 13 is a flowchart illustrating an example methodology in accordance with FIG. 12 for generating a design rule correct track pattern in an integrated circuit design according to the present embodiments.

FIG. 13 is a flowchart illustrating an example methodology according to these embodiments. In FIG. 13, the processing of steps S1306, S1308, S1310, S1312, S1314, S1316 and S1318 can be performed similarly as described above in connection with steps S304, S306, S308, S310, S312, S314 and S316, respectively, of the example method of FIG. 3.

As can be seen in FIG. 13, the methodology in this example includes initial step S1302 in which the locations, shapes and widths of pin sets 1202 and 1204 are received. In a next step S1304, initial tracks for all of the pins on the extreme edges of these sets 1202 and 1204 are created and these created tracks are used as the initial "sparse" set of tracks for generating a track/shape fill set 1206.

Figure 14:
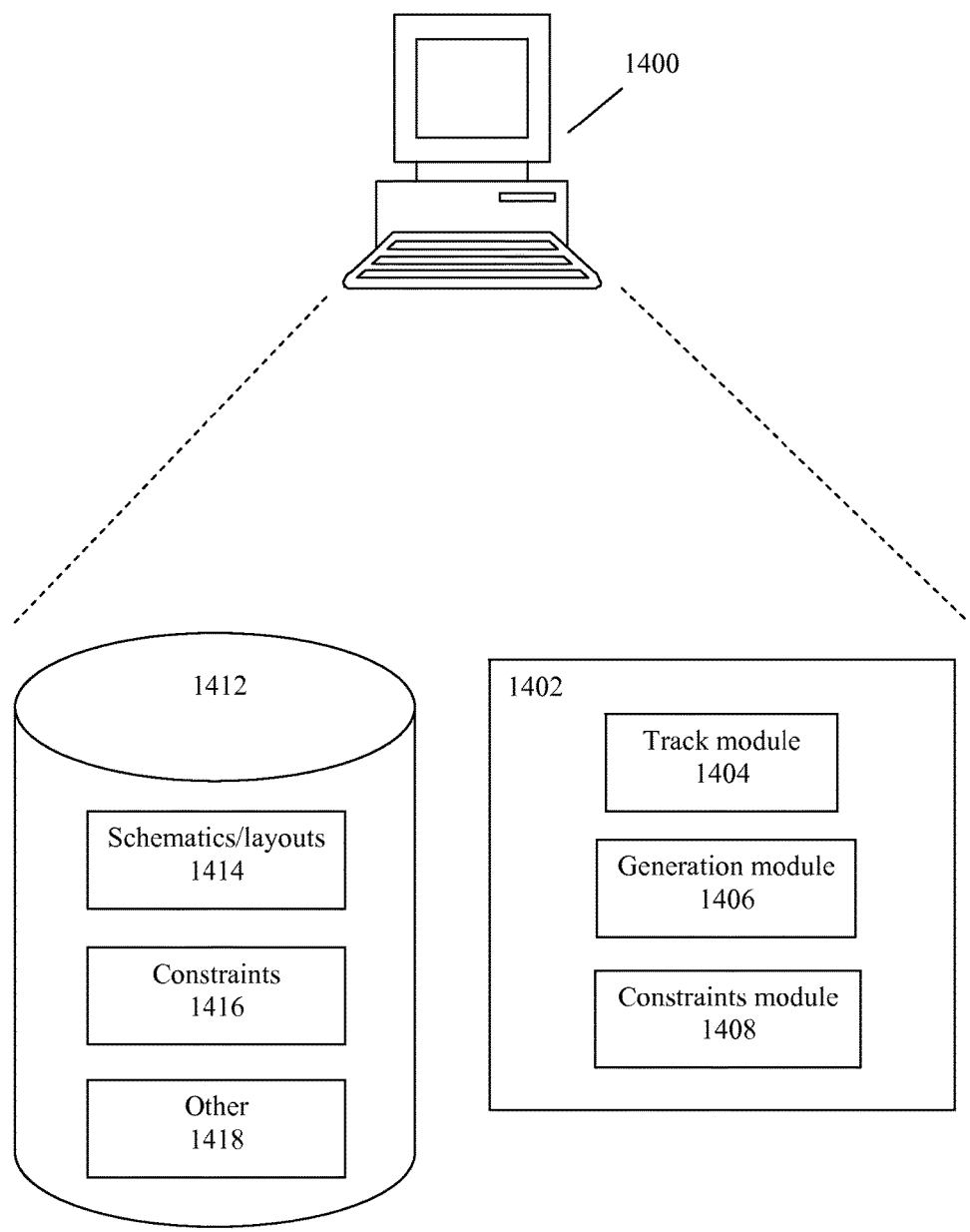
FIG. 14 is a functional block diagram illustrating an example system for generating a design rule correct track pattern in an integrated circuit design according to the present embodiments.

FIG. 14 is a functional block diagram of an example system for automatically generating design rule correct track patterns according to the present embodiments.

In embodiments, the system 1400 can be one or more general purpose computers that are loaded with software (e.g., EDA tools) and/or customized to include hardware for interactively implementing physical electronic designs. In some embodiments, the one or more computing systems 1400 comprise various components not shown such as processor(s) or processor core(s), memory, disks, etc. The software and/or custom hardware may include interactive or automated modules such as a placer, a routing engine, a layout editor, a design rule checker, a verification engine, or a floorplanner, etc. as will be appreciated by those skilled in the art. The one or more computing systems 1400 may further write to and read from a local or remote volatile or non-volatile computer accessible storage 1412 that stores thereon data or information such as, but not limited to, one or more databases such as schematic design database(s) or physical design database(s) 1414, libraries, data, rule decks, constraints (e.g., track specifications, minimum spacing, widths, BC rules, BCB rules, process rules etc.), etc. 1416, and/or other information or data 1418 (e.g., coloring data) that may be required to support the methodology of the present embodiments. In some embodiments, the one or more computing systems are implemented in a "cloud" configuration and/or a client/server configuration. For example, one or more server computers may be loaded with application software (e.g., a layout editor tool) for implementing some or all of the methodology of the present embodiments, and one or more client computers can communicate with the server computer(s) via a network to perform some or all of the methodology of the embodiments for a particular design.

In some embodiments, the one or more computing systems 1400 may, by various standalone software, hardware modules or combinations thereof 1402 (e.g., EDA tool), include a track pattern or track pattern group module 1404 to identify and create geometric representations of track patterns for allowing design rule checking according to the present embodiments, a track pattern generation module 1406 for implementing the track pattern generation methodologies of the present embodiments and one or more modules 1408 to perform constraint (e.g., color, width, alignment, etc.) violation analysis. Additionally or alternatively, any or all of modules 1404, 1406 and 1408 may be implemented by adapting certain pre-existing modules (e.g., placer, layout editor, design rule checker, etc.) with additional functionality as may be required to implement a WSP-aware environment to physically implement electronic designs having generated track patterns according to the present embodiments and as described above. Those skilled in the art will be able to understand how to implement various examples of such modules after being taught by the present disclosure.

According to aspects mentioned above, however, it should be noted that the architecture of system 1400 according to embodiments allows for certain advantages in performing design rule correct track pattern generation. For example, the constraints 1416 can be changed without requiring any changes in functionality of modules 1404, 1406 and 1408. This allows for the methodologies of the present embodiments to be performed for a wide range of processes and technologies, and allows for readily implementing a single integrated circuit design using the present methodologies in those different processes and technologies.

Although the present embodiments have been particularly described with reference to preferred ones thereof, it should be readily apparent to those of ordinary skill in the art that changes and modifications in the form and details may be made without departing from the spirit and scope of the present disclosure. It is intended that the appended claims encompass such changes and modifications.

What is claimed is:

1. A method for physically implementing a design for an integrated circuit, comprising:
providing first and second adjacent tracks in a track pattern set of the integrated circuit design, wherein the first and second adjacent tracks comprise a sparse set of tracks that have a metal density below a specified threshold;
presenting a third track between the identified first and second adjacent tracks;
determining whether the first, second and third tracks satisfy design constraints for physically implementing the integrated circuit design; and
if the first, second and third tracks satisfy design constraints, generating a new track pattern set by adding the third track to the track pattern set for the integrated circuit design, the new track pattern set comprising the first, second and third tracks,
wherein the new track pattern set is used as a guide for routing wires during a routing process for physically implementing the integrated circuit design.

2. A method according to claim 1, further comprising creating a geometric representation of the first, second and third tracks before determining whether the first, second and third tracks satisfy design constraints.

3. A method according to claim 1, further comprising assigning colors to the first, second and third tracks in accordance with a color model for physically implementing the integrated circuit design before determining whether the first, second and third tracks satisfy design constraints.

4. A method according to claim 1, wherein determining includes determining a spacing between the first and third tracks in accordance with the design constraints.

5. A method according to claim 1, further comprising optimizing for the track pattern set with respect to the design constraints.

6. A method according to claim 1, wherein presenting the third track includes assigning a width for the third track that is the same as a width for the first track.

7. A method according to claim 1, wherein presenting the third track includes assigning a width for the third track in accordance with a specified density for the track pattern set.

8. A method according to claim 1, wherein presenting the third track includes assigning a width for the third track in accordance with a specified frequency for the track pattern set.

9. A method according to claim 1, wherein presenting the third track includes assigning a width for the third track in accordance with a specified parameter for the track pattern set that is selected by a designer.

10. A method according to claim 1, wherein providing the first and second adjacent tracks includes receiving a selection of the first and second adjacent tracks for use in creating the track pattern set from a designer.

11. A method according to claim 10, further comprising receiving a specified period for the track pattern set from the designer.

12. A method according to claim 1, wherein providing the first and second adjacent tracks includes receiving a selection of a width of the first and second adjacent tracks for use in creating the track pattern set from a designer.

13. A method according to claim 12, further comprising receiving a specified period for the track pattern set from the designer.

14. A method according to claim 1, wherein providing the first and second adjacent tracks includes receiving an identification of a region in the integrated circuit design where no tracks exist between two existing track pattern sets in the integrated circuit design from a designer.

15. A method according to claim 1, wherein providing the first and second adjacent tracks includes receiving an identification of a region in the integrated circuit design where no tracks exist between two existing sets of shapes in the integrated circuit design from a designer.

16. A method according to claim 1, wherein providing the first and second adjacent tracks includes receiving an identification of one or more pins in the integrated circuit design from a designer.

17. A computer readable storage medium having instructions stored thereon which, when executed by a computer, cause the computer to execute a method for physically implementing a design for an integrated circuit, the method comprising:
- identifying first and second adjacent tracks of the integrated circuit design;
- inserting a third track between the identified first and second adjacent tracks;
- determining whether the first, second and third tracks satisfy design constraints for physically implementing the integrated circuit design; and
- if the first, second and third tracks satisfy design constraints, adding the third track to a track pattern set for the integrated circuit design, the track pattern set comprising the first, second and third tracks,
- wherein the track pattern set is used as a guide for routing wires during a routing process for physically implementing the integrated circuit design.

18. A computer readable storage medium according to claim 17, wherein the method further comprises assigning colors to the first, second and third tracks in accordance with a color model for physically implementing the integrated circuit design before determining whether the first, second and third tracks satisfy design constraints.

* * * * *